(12) United States Patent
Kim et al.

(10) Patent No.: US 10,281,792 B2
(45) Date of Patent: May 7, 2019

(54) ELECTROCHROMIC MIRROR

(71) Applicant: Electronics and Telecommunications Research Institute, Daejeon (KR)

(72) Inventors: Joo Yeon Kim, Daejeon (KR); Jeong Ik Lee, Daejeon (KR); Sang Hoon Cheon, Daejeon (KR); Nam Sung Cho, Daejeon (KR); Seong-Mok Cho, Daejeon (KR); Yong Hae Kim, Daejeon (KR); Tae-Youb Kim, Cheonan-si (KR); Hojun Ryu, Seoul (KR); Chil Seong Ah, Daejeon (KR); Chi-Sun Hwang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/864,455

(22) Filed: Jan. 8, 2018

(65) Prior Publication Data

US 2018/0231856 A1    Aug. 16, 2018

(30) Foreign Application Priority Data

Feb. 16, 2017   (KR) .................. 10-2017-0021259
Sep. 4, 2017    (KR) .................. 10-2017-0112786

(51) Int. Cl.
| | |
|---|---|
| G02F 1/155 | (2006.01) |
| G02F 1/157 | (2006.01) |
| G02F 1/1335 | (2006.01) |
| G02F 1/153 | (2006.01) |
| G02F 1/15 | (2019.01) |

(52) U.S. Cl.
CPC ........ *G02F 1/155* (2013.01); *G02F 1/133553* (2013.01); *G02F 1/157* (2013.01); *G02F 1/1533* (2013.01); *G02F 2001/1502* (2013.01); *G02F 2001/1536* (2013.01); *G02F 2001/1555* (2013.01); *G02F 2202/022* (2013.01)

(58) Field of Classification Search
CPC .. G02F 1/155; G02F 1/1533; G02F 1/133553; G02F 1/157; G02F 2001/1555; G02F 2202/022; G02F 2001/1536; G02F 2001/1502
USPC .................................. 359/265–275; 345/105
See application file for complete search history.

(56) References Cited

U.S. PATENT DOCUMENTS

| | | | |
|---|---|---|---|
| 8,300,297 B2 * | 10/2012 | Noh ................. | B82Y 20/00 359/266 |
| 2013/0334410 A1 | 12/2013 | Sutter et al. | |
| 2015/0303002 A1 | 10/2015 | Yun et al. | |
| 2016/0274391 A1 | 9/2016 | Kang et al. | |

FOREIGN PATENT DOCUMENTS

KR    10-1461825 B1    11/2014

* cited by examiner

*Primary Examiner* — Tuyen Tra
(74) *Attorney, Agent, or Firm* — Rabin & Berdo, P.C.

(57) ABSTRACT

An electrochromic mirror includes a first electrode structure, a second electrode structure provided on the first electrode structure, and an electrolyte provided between the first and second electrode structures. Here, the first electrode structure further includes a metal layer, a graphene layer disposed on the metal layer, and an interface part disposed between the metal layer and the graphene layer. The interface part includes a micro/nano-porous polymer material.

11 Claims, 9 Drawing Sheets

ELECTROCHROMIC MIRROR

CROSS-REFERENCE TO RELATED APPLICATIONS

This U.S. non-provisional patent application claims priority under 35 U.S.C. § 119 of Korean Patent Application Nos. 10-2017-0021259, filed on Feb. 16, 2017, and 10-2017-0112786, filed on Sep. 4, 2017, the entire contents of which are hereby incorporated by reference.

BACKGROUND

The present disclosure herein relates to an electrochromic mirror, and more particularly, to an electrochromic mirror having improved stability.

An electrochromic material has a color and a transmittance, which are varied by oxidation-reduction of a material. An electrochromic mirror capable of controlling reflectivity of light by applying an electric field may be formed by using the characteristics of the electrochromic material. The electrochromic mirror may be applied to a vehicle or the like to reduce glariness of a driver. The electrochromic mirror may use a method of using a liquid-state electrochromic material and a method of using a solid-state electrochromic material. The method of using a liquid-state electrochromic material is a method of arranging a transparent electrode and a metal electrode such as Ag, which perform mirror reflection on both ends of an electrolyte in which the electrochromic materials are dissolved. The method of using a thin-film type solid-state electrochromic material is a method of arranging an oxide electrochromic material on an electrode disposed on one side and dissolving an electrochromic material having the opposite characteristics in the electrolyte.

SUMMARY

The present disclosure provides an electrochromic mirror preventing a metal layer from being damaged by an electrolyte.

The present disclosure also provides an electrochromic mirror preventing a graphene layer from being delaminated.

However, an embodiment of the inventive concept is not limited to the above description.

An embodiment of the inventive concept provides an electrochromic mirror including: a first electrode structure; a second electrode structure provided on the first electrode structure; and an electrolyte provided between the first and second electrode structures. Here, the first electrode structure further includes: a metal layer; a graphene layer disposed on the metal layer; and an interface part disposed between the metal layer and the graphene layer. The graphene layer is fixed onto the metal layer by the interface part, and the interface part includes a micro/nano-porous polymer material.

According to exemplary embodiments, the interface part may include: a capping layer configured to cover a top surface of the metal layer; and an adhesion layer disposed between the capping layer and the graphene layer. The capping layer may separate the electrolyte from the metal layer, and the graphene layer may be fixed onto the metal layer by the adhesion layer.

According to exemplary embodiments, the capping layer may include a micro/nano-porous polymer material.

According to exemplary embodiments, the capping layer may include a polyvinylidene fluoride homopolymer (PVdF), a polyvinylidene fluoride-hexapropylene copolymer (PVdF-HFP), and a combination thereof.

According to exemplary embodiments, the adhesion layer may include an inorganic material including silicon (Si), a polymer having a benzene ring, an organic monomolecular material having a benzene ring, or a combination thereof.

According to exemplary embodiments, the adhesion layer may include $SiO_2$, polyimide, rubrene, or a combination thereof.

According to exemplary embodiments, the interface part may include: a capping layer; and adhesion particles dispersed in the capping layer. The capping layer may separate the electrolyte from the metal layer, and the graphene layer may be fixed onto the metal layer by the adhesion particles.

According to exemplary embodiments, the capping layer may include a polyvinylidene fluoride homopolymer (PVdF), and the adhesion particles may include $SiO_2$.

According to exemplary embodiments, the electrochromic mirror may further include an ionic reaction layer provided on the graphene layer, and the ionic reaction layer is colored when receiving electrons from the graphene layer and transparent when providing electrons to the graphene layer.

According to exemplary embodiments, the electrolyte may be colored when oxidized and transparent when reduced.

According to exemplary embodiments, the electrochromic mirror may further include a passivation layer provided on the graphene layer, and the passivation layer may prevent the graphene layer from being delaminated.

According to exemplary embodiments, the passivation layer may include a solid polymer-type electrolyte layer.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Exemplary embodiments of technical ideas of the inventive concept will be described with reference to the accompanying drawings so as to sufficiently understand constitutions and effects of the inventive concept. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

Like reference numerals refer to like elements throughout. Additionally, the embodiment in the detailed description will be described with sectional views as ideal exemplary views of the present invention. In the figures, the dimensions of regions are exaggerated for effective description of the technical contents. Areas exemplified in the drawings have general properties, and are used to illustrate a specific shape of a semiconductor package region. Thus, this should not be construed as limited to the scope of the present invention. It will be understood that although the terms first and second are used herein to describe various elements, these elements should not be limited by these terms. These terms are only used to distinguish one component from another component. Embodiments described and exemplified herein include complementary embodiments thereof.

In the following description, the technical terms are used only for explaining a specific exemplary embodiment while not limiting the inventive concept. In this specification, the terms of a singular form may include plural forms unless specifically mentioned. The meaning of "include," "comprise," "including," or "comprising," specifies a property, a region, a fixed number, a step, a process, an element and/or a component but does not exclude other properties, regions, fixed numbers, steps, processes, elements and/or components. It will also be understood that when an element or layer is referred to as being 'on' another one, it can be directly on the other one, or one or more intervening elements or layers may also be present. On the other hand, it will be understood that when an element is directly disposed on or connected to another one, further another element can not be present therebetween.

Hereinafter, the present invention will be described in detail by explaining preferred embodiments of the invention with reference to the attached drawings.

Figure 1:
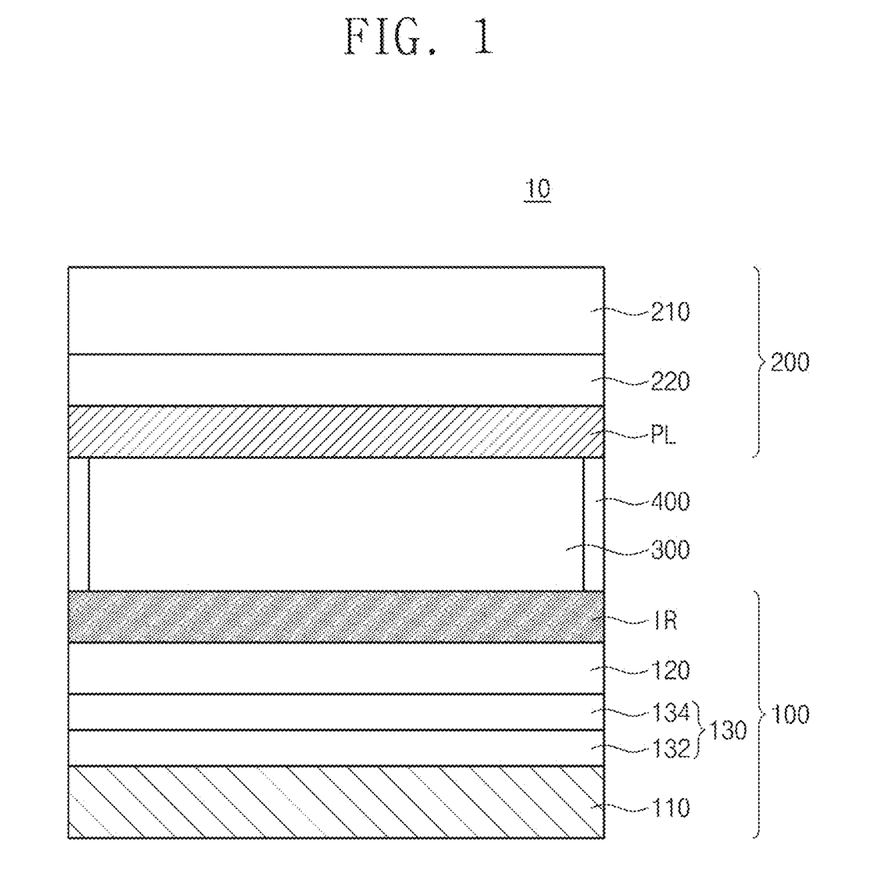
FIG. 1 is a conceptual view of an electrochromic mirror according to exemplary embodiments of the inventive concept.

FIG. 1 is a conceptual view of an electrochromic mirror according to exemplary embodiments of the inventive concept.

Referring to FIG. 1, an electrochromic mirror 10 may include a first electrode structure 100, a second electrode structure 200 disposed on the first electrode structure 100, a housing 400 provided between the first and second electrode structures 100 and 200, and an electrolyte 300 filling a region defined by the first and second electrode structures 100 and 200 and the housing 400.

The first electrode structure 100 may include a metal layer 110. For example, the metal layer 110 may include an aluminum (Al) layer, a silver (Ag) layer, a gold (Au) layer, or a combination layer thereof. The metal layer 110 may be a reflective layer. For example, light incident into a top surface of the metal layer 110 may be reflected by the metal layer 110. The metal layer 110 may have a surface roughness that is equal to or greater than about 1 nm and equal to or less than about 10 nm.

The graphene layer 120 may be provided on the metal layer 110. According to exemplary embodiments, the graphene layer 120 may be a reduction electrode. The graphene layer 120 may be electrically connected to a power unit (not shown) to receive a voltage.

An interface part 130 may be provided between the metal layer 110 and the graphene layer 120. The interface part 130 may protect the metal layer 110 from an element that may damage the metal layer 110. The interface part 130 may fix the graphene layer 120 onto the metal layer 110. An example of the interface part 130 will be described below in detail.

The interface part 130 may include a capping layer 132 and an adhesion layer 134, which are sequentially laminated. The capping layer 132 may allow the electrolyte 300 not to pass therethrough. According to exemplary embodiments, the capping layer 132 may include a micro/nano-porous polymer material. For example, the capping layer 132 may include a polyvinylidene fluoride homopolymer (PVdF), a polyvinylidene fluoride-hexapropylene copolymer (PVdF-HFP), and a combination thereof. However, an embodiment of the inventive concept is not limited to the material of the capping layer 132. In general, when the electrolyte directly contacts a metal layer, the metal layer may be damaged. The capping layer 132 according to an embodiment of the inventive concept may block the electrolyte 300 from directly contacting the metal layer 110 to prevent the metal layer 110 from being damaged. The capping layer 132 may be transparent.

The adhesion layer 134 may fix the graphene layer 120 onto the metal layer 110. An attractive force may be applied between the adhesion layer 134 and the capping layer 132 and between the adhesion layer 134 and the graphene layer 120. For example, an attractive force between the adhesion layer 134 and the graphene layer 120 may be a van der Waals force. According to exemplary embodiments, the adhesion layer 134 may include an inorganic material including silicon (e.g., $SiO_2$), a polymer having a benzene ring (e.g., polyimide), an organic monomolecular material having a benzene ring (e.g., rubrene), or a combination thereof. In general, due to a weak coupling force between the metal layer 110 and the graphene layer 120, the graphene layer 120 may be easily delaminated from the metal layer 110. The adhesion layer 134 according to an embodiment of the inventive concept may provide a strong coupling force between the graphene layer 120 and the metal layer 110 to prevent the graphene layer 120 from being delaminated from the metal layer 110. The adhesion layer 134 may be transparent.

The graphene layer 120 may be provided on an ionic reaction layer IR. The ionic reaction layer IR may have a color that is varied on the basis of an oxidation-reduction reaction. According to exemplary embodiments, the ionic reaction layer IR may include a material that is colored when reduced and transparent when oxidized. For example, the ionic reaction layer IR may include tungsten trioxide $WO_3$. When electrons are not provided to the ionic reaction layer IR, the ionic reaction layer IR may be in a transparent state. When the ionic reaction layer IR receives electrons (or when the ionic reaction layer IR is reduced), the ionic reaction layer IR may be converted from a transparent state to a colored state. When the ionic reaction layer IR (or when the ionic reaction layer IR is oxidized) loses electrons, the ionic reaction layer IR may be return to the transparent state.

The second electrode structure 200 may include a transparent substrate 210. The transparent substrate 210 may include a transparent non-metallic material. For example, the transparent substrate 210 may include glass, quartz, an organic material, an inorganic material, a polymer, or a combination thereof.

A transparent electrode 220 may be provided on the transparent substrate 210. The transparent electrode 220 may be an oxidation electrode. According to exemplary embodiments, the transparent electrode 220 may include graphene, an indium-tin-oxide (ITO), or a fluorine-doped tin oxide. The transparent electrode 220 may be electrically connected to a power unit (not shown) to receive a voltage. Here, the voltage applied to the transparent electrode 220 may have a polarity that is opposite to that of a voltage applied to the graphene layer 120.

A passivation layer PL may be provided on the transparent electrode 220. The passivation layer PL may be provided on the transparent electrode 220 to prevent the transparent electrode 220 from being delaminated from the transparent substrate 210. For example, the transparent electrode 220 may include graphene, and the passivation layer PL may prevent the graphene from being delaminated from the transparent substrate 210. The passivation layer PL may include a solid polymer-type electrolyte layer. For example, the passivation layer PL may include a nafion (DuPont Inc.) or flemion (Asahi Glass Inc.) layer. However, the passivation layer PL may be an arbitrary component. According to exemplary embodiments, the passivation layer PL may not be provided in the second electrode structure 200.

The electrolyte 300 may be electrically connected to the transparent electrode 220. The electrolyte 300 may include an oxidation electrochromic material that is colored when oxidized and transparent when reduced. The electrolyte 300 may be in a liquid or gel state. According to exemplary embodiments, when a voltage is not applied to the transparent electrode 220, the electrolyte 300 may be in a transparent state. When a voltage is applied to the transparent electrode 220, and the oxidation electrochromic material in the electrolyte 300 loses electrons to the transparent electrode 220 (or when the oxidation electrochromic material in the electrolyte 300 is oxidized), the electrolyte 300 may be colored. On the contrary, the oxidation electrochromic material in the electrolyte 300 gains electrons from the transparent electrode 220 (or when the oxidation electrochromic material in the electrolyte 300 is reduced), the electrolyte may return to a transparent state.

The housing 400 may be provided between the first and second electrode structures 100 and 200. The housing 400 may maintain a distance between the first and second electrode structures 100 and 200. The electrolyte 300 may be provided into a region surrounded by the housing 400 and the first and second electrode structures 100 and 200. An embodiment of the inventive concept is not limited to the shape of the housing 400.

In general, although other layers are disposed between the electrolyte and the metal layer, the electrolyte may move along a gap defined in an inside of the other layers to reach the metal layer. The electrolyte may damage the metal layer.

The metal layer 110 according to an embodiment of the inventive concept may be separated from the electrolyte 300 by the capping layer 132 and prevented from being damaged by the electrolyte 300. The graphene layer 120 according to an embodiment of the inventive concept may be fixed onto the metal layer 110 by the adhesion layer 134 and, accordingly, may not be delaminated from the metal layer 110. Resultantly, the electrochromic mirror 10 may have maximized stability.

Figure 2A:
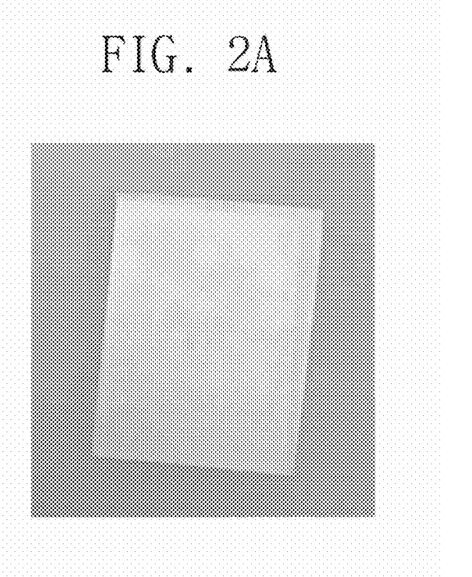
FIGS. 2A and 2B are photographs for explaining an experimental example according to exemplary embodiments of the inventive concept.
Figure 2B:
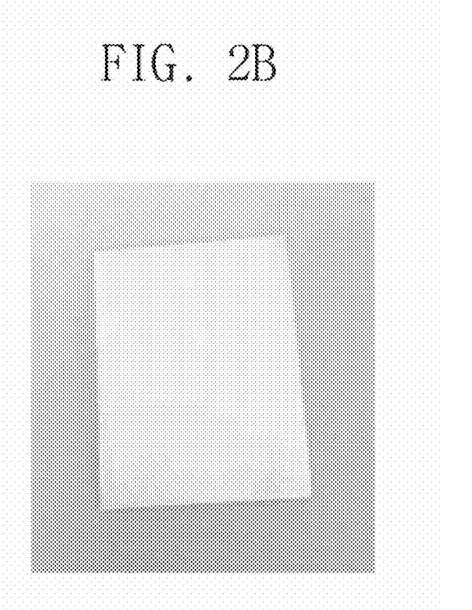

FIGS. 2A and 2B are photographs for explaining an experimental example according to an embodiment of the inventive concept.

Referring to FIG. 2A, a graphene layer is provided on a thermal-release film (TRF). The graphene layer has a dark portion and a bright portion. The dark portion represents a portion in which the graphene layer is delaminated, and the bright portion represents a portion in which the graphene layer is not delaminated. That is, it is seen that at least a portion of the graphene layer is delaminated.

Referring to FIG. 2B, an adhesion layer ($SiO_2$ layer) is provided on the TRF, and a graphene layer is provided on the adhesion layer. The entire graphene layer has only a bright portion. That is, the graphene layer does not have a dark portion unlike FIG. 2A. Resultantly, it is seen that the graphene layer is not delaminated.

Figure 3:
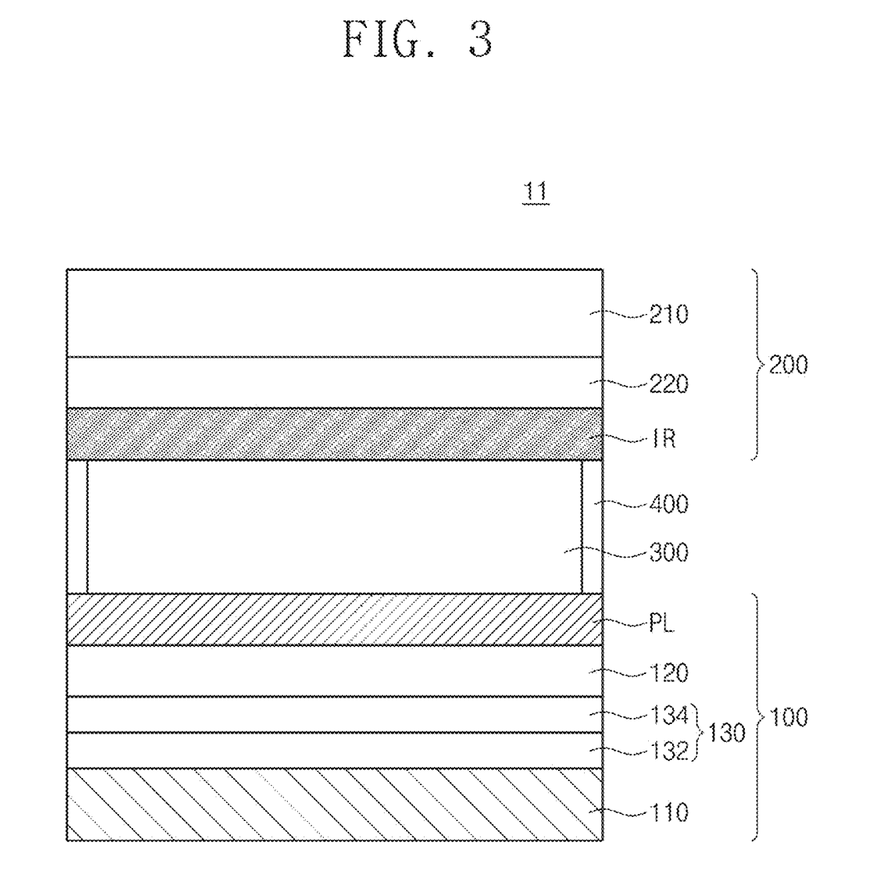
FIG. 3 is a cross-sectional view of an electrochromic mirror according to exemplary embodiments of the inventive concept.

FIG. 3 is a cross-sectional view of an electrochromic mirror according to exemplary embodiments of the inventive concept. For concise description, the substantially same contents as those described with reference to FIG. 1 will not be described.

Referring to FIG. 3, an electrochromic mirror 11 may include a first electrode structure 100, a second electrode structure 200 disposed on the first electrode structure 100, a housing 400 provided between the first and second electrode structures 100 and 200, and an electrolyte 300 filling a region defined by the first and second electrode structures 100 and 200 and the housing 400.

The electrochromic mirror 11 may be substantially the same as the electrochromic mirror 10 described with reference to FIG. 1, except for positions of a passivation layer PL and an ionic reaction layer IR. Hereinafter, the positions of the passivation layer PL and the ionic reaction layer IR will be described.

The passivation layer PL may be provided in the first electrode structure 100. The passivation layer PL may be provided on a graphene layer 120. The passivation layer PL may be provided between the graphene layer 120 and the electrolyte 300. The passivation layer PL may cover a top surface of the graphene layer 120. The passivation layer PL may prevent the graphene layer 120 from being delaminated from the metal layer 110. However, the passivation layer PL may be an arbitrary component. According to exemplary embodiments, the passivation layer PL may not be provided in the first electrode structure 100.

The ionic reaction layer IR may be provided in the second electrode structure 200. The ionic reaction layer IR may be provided on a transparent electrode 220. The ionic reaction layer IR may be provided between the transparent electrode 220 and the electrolyte 300. The ionic reaction layer IR may directly contact the electrolyte 300.

The graphene layer 120 according to an embodiment of the inventive concept may be fixed onto the metal layer 110 by the adhesion layer 134 and the passivation layer PL and, accordingly, may not be delaminated from the metal layer 110. Resultantly, the electrochromic mirror 11 may have maximized stability.

Figure 4:
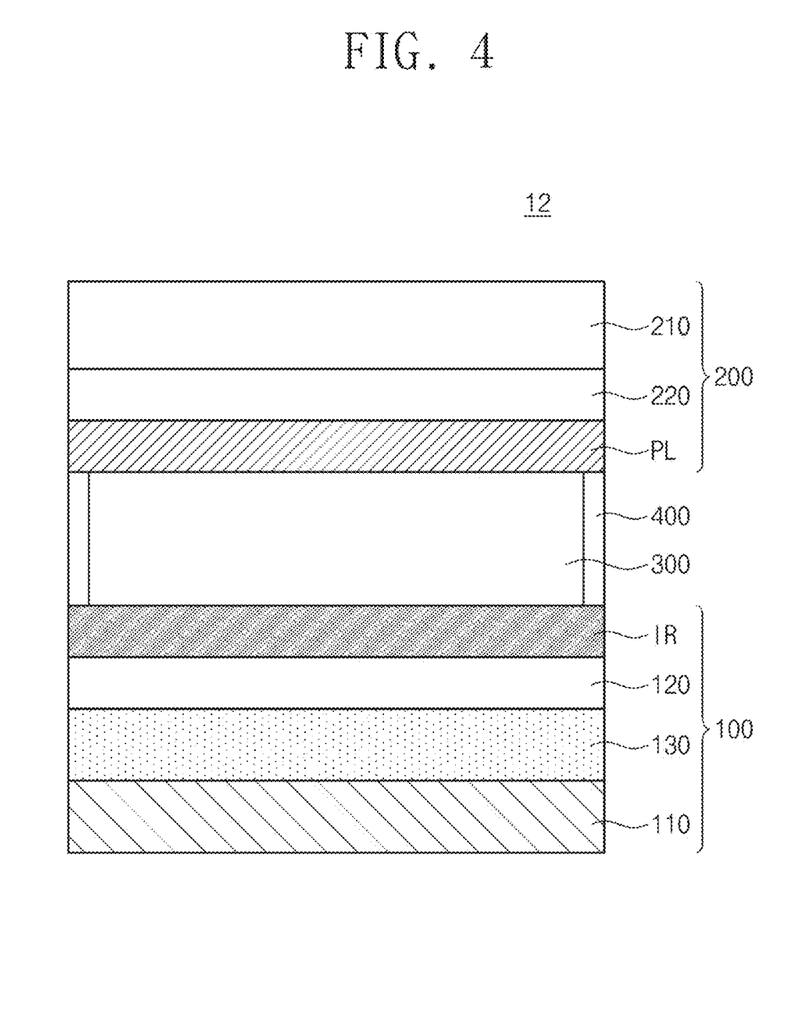
FIG. 4 is a cross-sectional view of an electrochromic mirror according to exemplary embodiments of the inventive concept.

FIG. 4 is a cross-sectional view of an electrochromic mirror according to exemplary embodiments of the inventive concept. For concise description, the substantially same contents as those described with reference to FIG. 1 will not be described.

Referring to FIG. 4, an electrochromic mirror 12 may include a first electrode structure 100, a second electrode structure 200 disposed on the first electrode structure 100, a housing 400 provided between the first and second electrode structures 100 and 200, and an electrolyte 300 filling a region defined by the first and second electrode structures 100 and 200 and the housing 400.

The electrochromic mirror 12 may be substantially the same as the electrochromic mirror 10 described with reference to FIG. 1, except for an interface part 130. Hereinafter, the interface part 130 will be described.

The interface part 130 may include a layer in which adhesion particles (not shown) are mixed in the capping layer 132 described with reference to FIG. 1. For example, the interface part 130 may include a micro/nano-porous polymer layer and adhesion particles dispersed in the micro/nano-porous polymer layer. The adhesion particles may include an inorganic material including silicon, polymer particles having a benzene ring, organic monomolecular material particles having a benzene ring, or a combination thereof. For example, the interface part 130 may include a polyvinylidene fluoride homopolymer (PVdF) layer in which $SiO_2$ particles are dispersed.

According to an embodiment of the inventive concept, the interface part 130 may separate the metal layer 110 from the electrolyte 300. Accordingly, the metal layer 110 may not be damaged by the electrolyte 300. According to an embodiment of the inventive concept, the interface part 130 may fix a graphene layer 120 onto the metal layer 110. Accordingly, the graphene layer 120 may not be delaminated from the metal layer 110. Resultantly, the electrochromic mirror 12 may have maximized stability.

Figure 5:
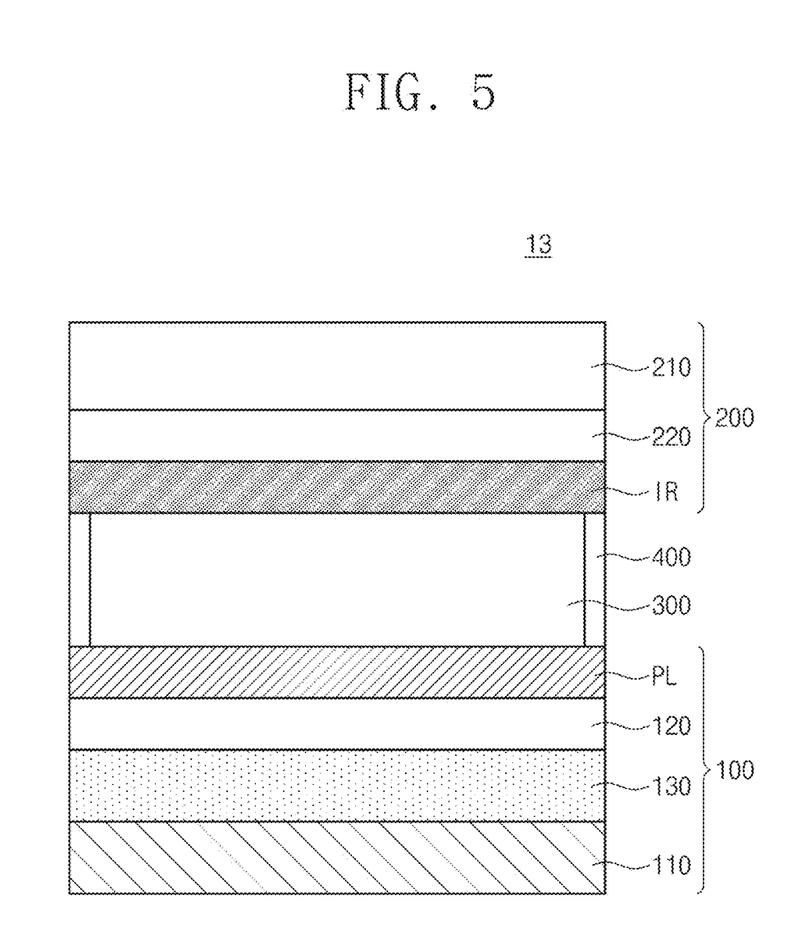
FIG. 5 is a cross-sectional view of an electrochromic mirror according to exemplary embodiments of the inventive concept.

FIG. 5 is a cross-sectional view of an electrochromic mirror according to exemplary embodiments of the inventive concept. For concise description, the substantially same contents as those described with reference to FIG. 4 will not be described.

Referring to FIG. 5, an electrochromic mirror 13 may include a first electrode structure 100, a second electrode structure 200 disposed on the first electrode structure 100, a housing 400 provided between the first and second electrode structures 100 and 200, and an electrolyte 300 filling a region defined by the first and second electrode structures 100 and 200 and the housing 400.

The electrochromic mirror 13 may be substantially the same as the electrochromic mirror 12 described with reference to FIG. 4, except for positions of a passivation layer PL and an ionic reaction layer IR. Hereinafter, the positions of the passivation layer PL and the ionic reaction layer IR will be described.

The passivation layer PL may be provided in the first electrode structure 100. The passivation layer PL may be provided on a graphene layer 120. The passivation layer PL may be provided between the graphene layer 120 and the electrolyte 300. The passivation layer PL may cover a top surface of the graphene layer 120. The passivation layer PL may prevent the graphene layer 120 from being delaminated from the metal layer 110. However, the passivation layer PL may be an arbitrary component. According to exemplary embodiments, the passivation layer PL may not be provided in the first electrode structure 100.

The ionic reaction layer IR may be provided in the second electrode structure 200. The ionic reaction layer IR may be provided on a transparent electrode 220. The ionic reaction layer IR may be provided between the transparent electrode 220 and the electrolyte 300. The ionic reaction layer IR may directly contact the electrolyte 300.

The graphene layer 120 according to an embodiment of the inventive concept may be fixed onto the metal layer 110 by an interface part 130 and the passivation layer PL and, accordingly, may not be delaminated from the metal layer 110. Resultantly, the electrochromic mirror 13 may have maximized stability.

Figure 6:
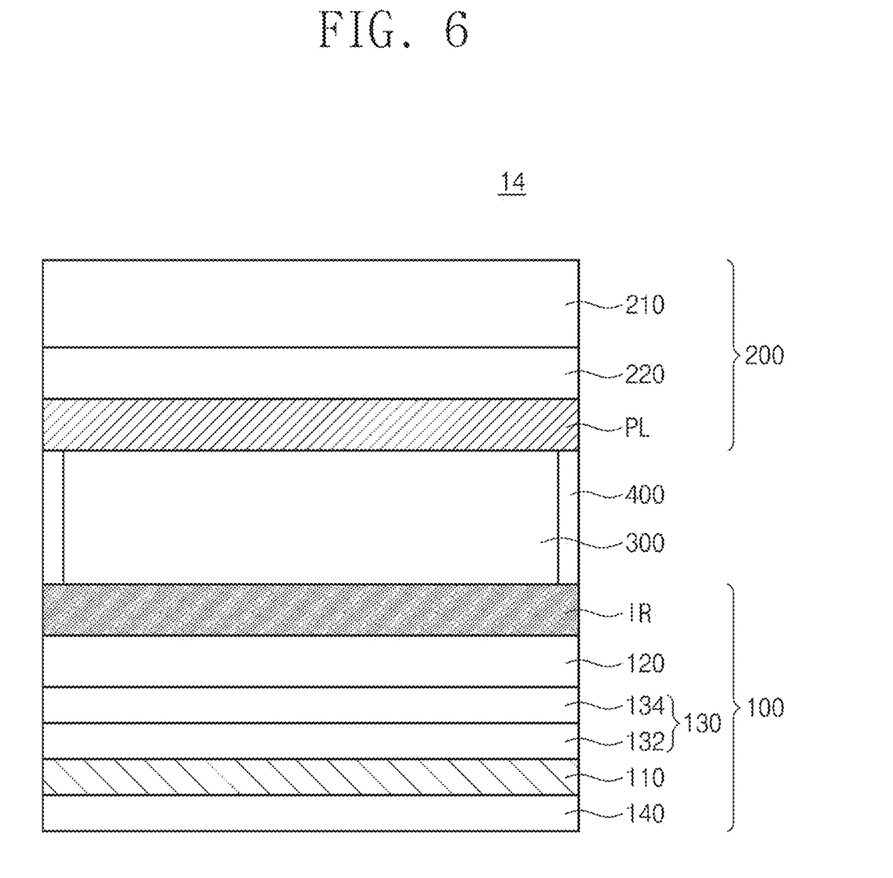
FIG. 6 is a cross-sectional view of an electrochromic mirror according to exemplary embodiments of the inventive concept.

FIG. 6 is a cross-sectional view of an electrochromic mirror according to exemplary embodiments of the inventive concept. For concise description, the substantially same contents as those described with reference to FIG. 1 will not be described.

Referring to FIG. 6, an electrochromic mirror 14 may include a first electrode structure 100, a second electrode structure 200 disposed on the first electrode structure 100, a housing 400 provided between the first and second electrode structures 100 and 200, and an electrolyte 300 filling a region defined by the first and second electrode structures 100 and 200 and the housing 400.

The electrochromic mirror 14 may be substantially the same as the electrochromic mirror 10 described with reference to FIG. 1, except for a support substrate 140. Hereinafter, the support substrate 140 will be described.

The support substrate 140 may be provided below the metal layer 110. The support substrate 140 may be spaced apart from a capping layer 132 with the metal layer 110 therebetween. The support substrate 140 may include a non-metallic material. The support substrate 140 may be transparent. However, an embodiment of the inventive concept is not limited to the color of the support substrate 140. According to exemplary embodiments, the support substrate 140 may be opaque. For example, the support substrate 140 may include glass, quartz, an organic material, an inorganic material, a polymer, or a combination thereof.

The metal layer 110 according to an embodiment of the inventive concept may be separated from the electrolyte 300 by a capping layer 132 and prevented from being damaged by the electrolyte 300. A graphene layer 120 according to an embodiment of the inventive concept may be fixed onto the metal layer 110 by an adhesion layer 134 and, accordingly, may not be delaminated from the metal layer 110. Resultantly, the electrochromic mirror 14 may have maximized stability.

Figure 7:
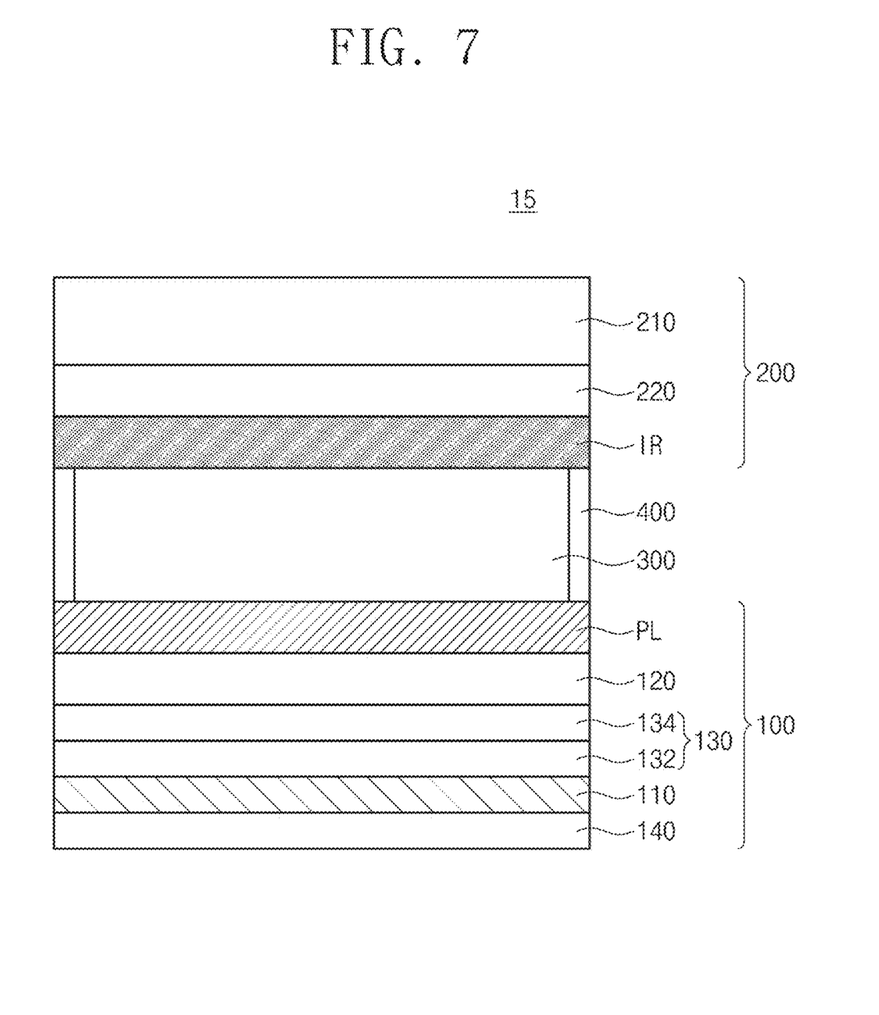
FIG. 7 is a cross-sectional view of an electrochromic mirror according to exemplary embodiments of the inventive concept.

FIG. 7 is a cross-sectional view of an electrochromic mirror according to exemplary embodiments of the inventive concept. For concise description, the substantially same contents as those described with reference to FIG. 6 will not be described.

Referring to FIG. 7, an electrochromic mirror 15 may include a first electrode structure 100, a second electrode structure 200 disposed on the first electrode structure 100, a housing 400 provided between the first and second electrode structures 100 and 200, and an electrolyte 300 filling a region defined by the first and second electrode structures 100 and 200 and the housing 400.

The electrochromic mirror 15 may be substantially the same as the electrochromic mirror 12 described with reference to FIG. 6, except for positions of a passivation layer PL and an ionic reaction layer IR. Hereinafter, the positions of the passivation layer PL and the ionic reaction layer IR will be described.

The passivation layer PL may be provided in the first electrode structure 100. The passivation layer PL may be provided on a graphene layer 120. The passivation layer PL may be provided between the graphene layer 120 and the electrolyte 300. The passivation layer PL may cover a top surface of the graphene layer 120. The passivation layer PL may prevent the graphene layer 120 from being delaminated from the metal layer 110. However, the passivation layer PL may be an arbitrary component. According to exemplary embodiments, the passivation layer PL may not be provided in the first electrode structure 100.

The ionic reaction layer IR may be provided in the second electrode structure 200. The ionic reaction layer IR may be provided on a transparent electrode 220. The ionic reaction layer IR may be disposed between the transparent electrode 220 and the electrolyte 300. The ionic reaction layer IR may directly contact the electrolyte 300.

The graphene layer 120 according to an embodiment of the inventive concept may be fixed onto the metal layer 110 by an adhesion layer 134 and the passivation layer PL and, accordingly, may not be delaminated from the metal layer 110. Resultantly, the electrochromic mirror 15 may have maximized stability.

Figure 8:
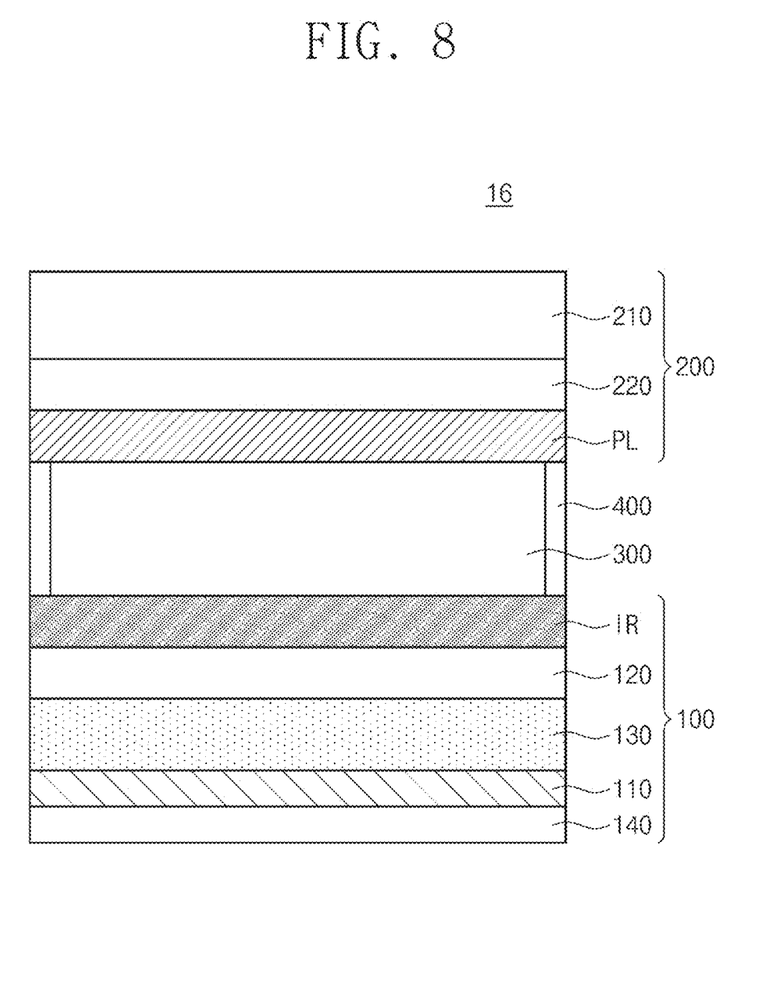
FIG. 8 is a cross-sectional view of an electrochromic mirror according to exemplary embodiments of the inventive concept.

FIG. 8 is a cross-sectional view of an electrochromic mirror according to exemplary embodiments of the inventive concept. For concise description, the substantially same contents as those described with reference to FIG. 6 will not be described.

Referring to FIG. 8, an electrochromic mirror 16 may include a first electrode structure 100, a second electrode structure 200 disposed on the first electrode structure 100, a housing 400 provided between the first and second electrode structures 100 and 200, and an electrolyte 300 filling a region defined by the first and second electrode structures 100 and 200 and the housing 400.

The electrochromic mirror 16 may be substantially the same as the electrochromic mirror 14 described with reference to FIG. 6, except for an interface part 130. Hereinafter, the interface part 130 will be described.

The interface part 130 may include a layer in which adhesion particles (not shown) are mixed in the capping layer 132 described with reference to FIG. 1. For example, the interface part 130 may include an inorganic material including silicon, polymer particles having a benzene ring, organic monomolecular material particles having a benzene ring, or a micro/nano-porous polymer layer in which a combination thereof is dispersed. For example, the interface part 130 may include a polyvinylidene fluoride homopolymer (PVdF) layer in which $SiO_2$ particles are dispersed.

According to an embodiment of the inventive concept, the interface part 130 may separate the metal layer 110 from the electrolyte 300. Accordingly, the metal layer 110 may not be damaged by the electrolyte 300. According to an embodiment of the inventive concept, the interface part 130 may fix a graphene layer 120 onto the metal layer 110. Accordingly, the graphene layer 120 may not be delaminated from the metal layer 110. Resultantly, the electrochromic mirror 16 may have maximized stability.

Figure 9:
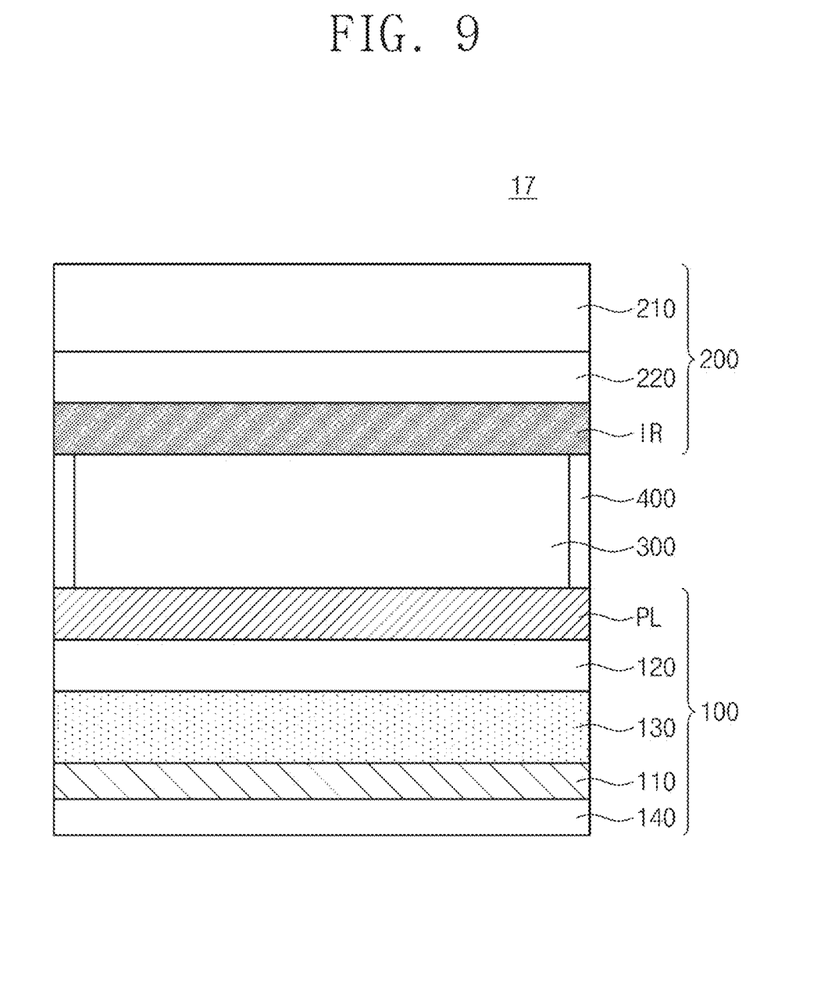
FIG. 9 is a cross-sectional view of an electrochromic mirror according to exemplary embodiments of the inventive concept.

FIG. 9 is a cross-sectional view of an electrochromic mirror according to exemplary embodiments of the inventive concept. For concise description, the substantially same contents as those described with reference to FIG. 8 will not be described.

Referring to FIG. 9, an electrochromic mirror 17 may include a first electrode structure 100, a second electrode structure 200 disposed on the first electrode structure 100, a housing 400 provided between the first and second electrode structures 100 and 200, and an electrolyte 300 filling a region defined by the first and second electrode structures 100 and 200 and the housing 400.

The electrochromic mirror 17 may be substantially the same as the electrochromic mirror 12 described with reference to FIG. 8, except for positions of a passivation layer PL and an ionic reaction layer IR. Hereinafter, the positions of the passivation layer PL and the ionic reaction layer IR will be described.

The passivation layer PL may be provided in the first electrode structure 100. The passivation layer PL may be provided on a graphene layer 120. The passivation layer PL may be provided between the graphene layer 120 and the electrolyte 300. The passivation layer PL may cover a top surface of the graphene layer 120. The passivation layer PL may prevent the graphene layer 120 from being delaminated from the metal layer 110. However, the passivation layer PL may be an arbitrary component. According to exemplary embodiments, the passivation layer PL may not be provided in the first electrode structure 100.

The ionic reaction layer IR may be provided in the second electrode structure 200. The ionic reaction layer IR may be provided on a transparent electrode 220. The ionic reaction layer IR may be disposed between the transparent electrode 220 and the electrolyte 300. The ionic reaction layer IR may directly contact the electrolyte 300.

The graphene layer 120 according to an embodiment of the inventive concept may be fixed onto the metal layer 110 by an interface part 130 and the passivation layer PL and, accordingly, may not be delaminated from the metal layer 110. Resultantly, the electrochromic mirror 17 may have maximized stability.

According to the embodiment of the inventive concept, the electrochromic mirror having the improved stability of the electrode structure may be provided.

However, the effects of the embodiment of the inventive concept are not limited to the above description.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An electrochromic mirror comprising:
a first electrode structure;
a second electrode structure provided on the first electrode structure; and
an electrolyte provided between the first and second electrode structures,
wherein the first electrode structure further comprises:
a metal layer;
a graphene layer disposed on the metal layer; and
an interface part disposed between the metal layer and the graphene layer, and
the interface part includes a micro/nano-porous polymer material.

2. The electrochromic mirror of claim 1, wherein the interface part comprises:
a capping layer configured to cover a top surface of the metal layer; and
an adhesion layer disposed between the capping layer and the graphene layer.

3. The electrochromic mirror of claim 2, wherein the capping layer comprises a micro/nano-porous polymer material.

4. The electrochromic mirror of claim 3, wherein the capping layer comprises a polyvinylidene fluoride homopolymer (PVdF), a polyvinylidene fluoride-hexapropylene copolymer (PVdF-HFP), and a combination thereof.

5. The electrochromic mirror of claim 2, wherein the adhesion layer an inorganic material including silicon, a polymer having a benzene ring, an organic monomolecular material having a benzene ring, or a combination thereof.

6. The electrochromic mirror of claim 5, wherein the adhesion layer comprises $SiO_2$, polyimide, rubrene, or a combination thereof.

7. The electrochromic mirror of claim 1, wherein the interface part comprises:
   a capping layer; and
   adhesion particles dispersed in the capping layer.

8. The electrochromic mirror of claim 7, wherein the capping layer comprises a polyvinylidene fluoride homopolymer (PVdF), and
   the adhesion particles comprise $SiO_2$.

9. The electrochromic mirror of claim 1, further comprising an ionic reaction layer provided on the graphene layer,
   wherein the ionic reaction layer is colored when receiving electrons from the graphene layer and transparent when providing electrons to the graphene layer.

10. The electrochromic mirror of claim 1, further comprising a passivation layer provided on the graphene layer.

11. The electrochromic mirror of claim 10, wherein the passivation layer comprises a solid polymer-type electrolyte layer.

* * * * *